US010059419B2

(12) United States Patent
Glueckhardt et al.

(10) Patent No.: US 10,059,419 B2
(45) Date of Patent: Aug. 28, 2018

(54) LAND CONNECTION FOR MARINE VESSELS HAVING AN ARTICULATED CRANE

(75) Inventors: Reimund Glueckhardt, Wietmarschen (DE); Juergen Moser, Wiesenthau (DE); Hans-Erhard Schmidt, Melbeck (DE)

(73) Assignees: SIEMENS AKTIENGESELLSCHAFT, Munich (DE); STEMMANN-TECHNIK GMBH, Schuettorf (DE)

( * ) Notice: Subject to any disclaimer, the term of this patent is extended or adjusted under 35 U.S.C. 154(b) by 160 days.

(21) Appl. No.: 13/262,778

(22) PCT Filed: Mar. 31, 2010

(86) PCT No.: PCT/EP2010/054286
§ 371 (c)(1),
(2), (4) Date: Oct. 3, 2011

(87) PCT Pub. No.: WO2010/112544
PCT Pub. Date: Oct. 7, 2010

(65) Prior Publication Data
US 2012/0031721 A1 Feb. 9, 2012

(30) Foreign Application Priority Data

Apr. 2, 2009 (DE) .................. 10 2009 015 603

(51) Int. Cl.
*B63J 3/04* (2006.01)
*B60L 9/00* (2006.01)
*B60L 11/18* (2006.01)

(52) U.S. Cl.
CPC . *B63J 3/04* (2013.01); *B60L 9/00* (2013.01); *B60L 11/1809* (2013.01);
(Continued)

(58) Field of Classification Search
CPC ... Y02T 90/14; Y02T 10/7088; Y02T 90/121; Y02T 90/125; B60L 11/1818;
(Continued)

(56) References Cited

U.S. PATENT DOCUMENTS 3,950,059 A * 4/1976 Anhalt et al. ................. 439/261
4,030,617 A * 6/1977 Richter ............................ 414/4
(Continued)

FOREIGN PATENT DOCUMENTS

DE 2640033 A1 1/1978
DE 4412643 A1 3/1995
(Continued)

*Primary Examiner* — Mark T Le
(74) *Attorney, Agent, or Firm* — Laurence Greenberg; Werner Stemer; Ralph Locher

(57) ABSTRACT

An apparatus for electrically connecting a polyphase vessel distribution system of a vessel to a polyphase land supply system having a supply system connection disposed on land to be connected to a vessel system connection of the vessel distribution system at least in sections by at least one cable connection, enables a fast and secure connection of the land supply system to the vessel distribution system. During normal operation, vessel movements can be reliably compensated by at least one articulated arm used as a support for one or more cable connections. The articulated arm has arm segments interconnected by at least one articulated connection. A joint drive is associated with each articulated connection for mutually pivoting the arm segments interconnected by the articulated connection, which is associated with the joint drive.

14 Claims, 2 Drawing Sheets

(52) U.S. Cl.
CPC ....... *B60L 11/1827* (2013.01); *B60L 2200/32* (2013.01); *B63J 2003/043* (2013.01); *Y02T 10/7005* (2013.01); *Y02T 10/7072* (2013.01); *Y02T 90/121* (2013.01); *Y02T 90/125* (2013.01); *Y02T 90/14* (2013.01)

(58) Field of Classification Search
CPC .............. B60L 11/1827; B60L 11/1809; B60L 2200/32; B60L 9/00; B25J 19/0029; B25J 19/0025; H02J 7/0027; B63J 2003/043
USPC ........................................ 191/12 R; 320/109
See application file for complete search history.

(56) References Cited

U.S. PATENT DOCUMENTS

| | | | | |
|---|---|---|---|---|
| 4,672,279 | A | * | 6/1987 | Hosokawa et al. ......... 318/568.2 |
| 5,036,754 | A | * | 8/1991 | Simms et al. ................... 454/65 |
| 5,823,218 | A | | 10/1998 | Schlecht et al. |
| 6,157,162 | A | * | 12/2000 | Hayashi et al. .............. 320/104 |
| 6,250,174 | B1 | * | 6/2001 | Terada et al. .............. 74/490.02 |
| 6,329,725 | B1 | | 12/2001 | Woodall et al. |
| 8,026,629 | B2 | | 9/2011 | Schmidt et al. |
| 2002/0064444 | A1 | * | 5/2002 | Wunderly et al. ............ 414/680 |
| 2005/0278099 | A1 | | 12/2005 | Benckert et al. |
| 2007/0251784 | A1 | | 11/2007 | Popesco |
| 2009/0018700 | A1 | * | 1/2009 | Okamoto et al. ............. 700/260 |

FOREIGN PATENT DOCUMENTS

| | | |
|---|---|---|
| DE | 19503895 A1 | 8/1996 |
| EP | 1667301 A1 | 6/2006 |
| JP | 2006290261 A | 10/2006 |
| WO | 2004020765 A1 | 3/2004 |
| WO | 2006079636 A1 | 8/2006 |

\* cited by examiner

LAND CONNECTION FOR MARINE VESSELS HAVING AN ARTICULATED CRANE

BACKGROUND OF THE INVENTION

Field of the Invention

The invention relates to an apparatus for electrical connection of a polyphase marine-vessel distribution system in a marine vessel to a polyphase land supply system having a supply system connection which is arranged on the land and can be connected at least in places via at least one cable connection to a marine-vessel system connection of the marine-vessel distribution system.

An apparatus such as this is already known from DE 10 2005 004 628 A1. The apparatus disclosed there is intended for supplying electrical power from the land to a marine vessel in a harbor. A docked marine vessel has to be supplied with power from the land in order to allow the diesel engines in the marine vessel, which are required for supplying power, to be shut down. The diesel engines have a high fuel consumption and contribute considerably to the environmental pollution, which is considered to be antisocial, in particular in port towns. In order to supply power from the land, the land supply system is connected to the marine-vessel distribution system. Since the land supply system and the marine-vessel distribution system may be at different frequencies and may use different star-point arrangements and the like, the two systems are connected via a frequency converter. The frequency converter in the already known land connection comprises a rectifier which is connected to an inverter via a DC voltage intermediate circuit, such that the AC voltage which is provided from the land supply system can be converted to the AC voltage which is suitable for the respective marine-vessel distribution system. By way of example, this makes it possible to supply electrical power from a 50 Hz land supply system to a marine-vessel distribution system which is designed for 60 Hz AC voltage. A cable connection is provided in order to connect the frequency converter, which is arranged on the land, to the distribution system in the marine vessel. The cable connection comprises a cable drum around which the connecting cable, which carries electrical power, is wound. The cable drum makes it possible to compensate for the tidal range, that is to say a change in the height of the marine vessel as the water level changes. However, the installation of the cable connection with a cable drum is cumbersome and is associated with increased operating costs.

BRIEF SUMMARY OF THE INVENTION

The object of the invention is therefore to provide an apparatus of the type mentioned initially which allows the land supply system to be connected to the marine-vessel distribution system quickly and safely, with marine-vessel movements after the systems have been connected being compensated for.

The invention achieves this object by means of at least one jointed arm, which is used as a support for a or each cable connection and has arm segments which are connected to one another via at least one articulated connection, with each articulated connection being associated with a joint drive which is designed for mutual pivoting of the arm segments which are connected to one another by means of the articulated connection, which is associated with said joint drive.

According to the invention, at least one jointed arm is provided for carrying one or all of the cable connections, which each comprise a high-voltage cable and extend at least partially between the marine-vessel distribution system and the marine-vessel system connection during operation of the apparatus. For example, a single jointed arm is provided within the scope of the invention, carrying one or more cable connections. The jointed arm can carry all the cable connections or only some of the cable connections, with the remaining cable connections of the apparatus being passed to the marine vessel to be supplied without a jointed arm. In addition, a plurality of jointed arms can be provided within the scope of the invention, with each jointed arm carrying one or more cable connections. As has already been mentioned, the cable connection comprises a cable, in particular a high-voltage cable.

Jointed arms have become known in conjunction with concrete pumps. For example, DE 195 03 895 A1 describes a concrete pump having a distribution mast, which is in the form of a jointed arm. The invention is based on the knowledge that a jointed arm, as is known from the construction industry and which can also be referred to as an articulated crane, is also ideally suitable for the land connection to marine vessels.

Within the scope of the invention, the jointed arm comprises at least two arm segments, which are connected to one another via an articulated connection. In other words, the arm segments are articulated on one another, with a joint drive being designed to vary the pivot angle, which the arm segments which are connected to one another cover with respect to their common articulated connection, in a suitable manner. Said jointed arm is anchored firmly on the land via an expedient ground holder. That end of the jointed arm which is remote from the ground holder in contrast carries the free end of each cable connection which, for example, is equipped with a plug connection part. The height and the position of the cable ends can be adjusted variably by adjusting the pivot angle or angles of the jointed arm, such that the cable ends of the cable connections can be positioned in the immediate vicinity of the marine-vessel system connection, with the aid of the jointed arm. Within the scope of the invention, the number of arm segments is dependent on the respective requirement, and in particular on the size of the marine vessel to be supplied with electrical power. For example, if the number of arm segments is four, said four arm segments are connected to one another via three articulated connections. In this case, each articulated connection is associated with a joint drive, with the joint drive in each case being supported on the two arm segments which are connected to one another, thus allowing the arm segments to spread out.

Each articulated connection advantageously allows pivoting about one joint rotation axis. In other words, the arm segments can pivot in only one direction. Articulated connections such as these on the one hand are inexpensive while on the other hand simplify accurate alignment of the free end of the jointed arm in this way.

According to one advantageous further development, a plurality of articulated connections are provided, with the articulated connections having joint rotation axes which are aligned parallel to one another. According to this advantageous further development, the jointed arm is first of all aligned toward the marine-vessel system connection, in order then to determine the position of the cable end and of the free end of the jointed arm by adjustment of the pivot angle or angles.

Each joint rotation axis is expediently defined by a hollow cylinder through which each cable connection extends. In other words, in addition to providing an articulated connection for two arm segments, the hollow cylinder is also used to guide all the cable connections.

Expediently, the jointed arm is attached to a rotating tower which can rotate about a vertical rotation axis. In other words, the ground holder is realized as a rotating tower. This expedient further development of the invention allows the jointed arm to be aligned with respect to the marine-vessel system connection in a particularly simple manner. Once the jointed arm has been aligned, the joint drives are used to adjust the respective pivot angle, such that the free cable end is located in the immediate vicinity of the marine-vessel system connection and can be connected to the marine-vessel distribution system in a simple manner, for example by hand.

Advantageously, the jointed arm is articulated on the rotating tower by means of an articulated connection. The additional articulated connection increases the flexibility of the jointed arm, in terms of its range and height. The articulated connection, which is used to fit the jointed arm to the rotating tower, advantageously has a joint rotation axis which is aligned parallel to the joint rotation axes of the other articulated connections.

According to one advantageous further development, the rotating tower can be moved in one direction. For example, the rotating tower is guided on rails which extend parallel to the harbor quay, where the marine vessel to be supplied with electrical power is docked. While power is being supplied from the land, the free end of the jointed arm is firmly anchored to the marine vessel, with the joint drives being switched off. The arm segments can therefore pivot freely, thus allowing the jointed arm to compensate in a simple manner for position fluctuations of the marine vessel caused, for example, by the tidal range or other water movements. The capability to move the rotating tower therefore considerably enhances the safety of the apparatus.

According to one expedient further development, the joint drives are in the form of hydraulic drives. By way of example, the hydraulic drive comprises a hydraulic cylinder in which a hydraulic piston is arranged such that it can move freely. The hydraulic piston and the hydraulic cylinder bound a hydraulic chamber which is filled with hydraulic fluid. In this case, the piston is connected to a piston rod which is supported on the arm segment, the latter of which is connected via the articulated connection to that arm segment to which the hydraulic cylinder is attached. In order to pivot the arm segments, the hydraulic pressure in the hydraulic chamber is increased, for example, such that the hydraulic piston is moved somewhat upward in the hydraulic cylinder, increasing the pivot angle, which is defined by the arm segments, which are articulated on one another, with respect to their articulated connection. In contrast, said pivot angle decreases when the pressure falls. A hydraulic pump is used to adjust the hydraulic pressure and interacts with an expedient control system or control unit.

Expediently, locking means are provided for fixing the free end of the jointed arm to the marine vessel.

As has already been mentioned, the locking means allow the cable support to be connected to the marine vessel, with the joint drives being shut down. This makes it possible to conveniently compensate for vertical or lateral movements of the marine vessel.

According to one further development which is expedient in this context, the locking means have an insert part, which is arranged at the free end of the jointed arm, and a holding part, which has a complementary shape to the insert part and is arranged on the marine vessel. According to this expedient further development, the conical insert part can, for example, be inserted into a holder with a complementary shape. The free end of the jointed arm is thus fixed to the marine vessel. The free end of the cable can now be connected to the marine-vessel supply system for example by hand by means of an expedient plug connection.

A monitoring device is expediently provided which in each case detects the pivot angle which is covered by the arm segments with respect to the articulated connection, and triggers a warning signal if a pivot angle threshold value is exceeded. This advantageous further refinement makes it possible to produce an alarm signal if, for example, the marine vessel is no longer secured to the harbor quay.

Expediently, the end of each cable connection which is designed for connection to the marine-vessel system connection is held by a cable end guide, which is held by a cable end articulated connection at the free end of the jointed arm, with the cable end articulated connection being associated with a cable end drive which is designed to pivot the cable end guide. The cable end guide simplifies the electrical connection between the marine-vessel distribution system and the cable, since the cable connections, which are generally heavy, can be moved into the immediate vicinity of the marine-vessel system connection with the aid of the cable end guide, which can be pivoted by machine.

According to one further development which is expedient in this context, the cable end articulated connection has two pivot axes which extend at right angles to one another. In other words, the cable end articulated connection can be pivoted in two directions, thus allowing the cable end guide to be aligned in an even simpler manner. The cable end articulated connection is then expediently associated with two cable end drives.

According to one preferred refinement of the invention, the supply system connection is connected to the marine-vessel system connection via a frequency converter, which is likewise arranged on the land. The cable connection and the cable connections extend between the marine-vessel distribution system and the frequency converter, for example, during operation of the apparatus. A frequency converter is required when the land supply system and the marine-vessel distribution system to be supplied may be at different frequencies, have different star-point arrangements, and the like. The frequency converter for the already known land connection comprises, for example, a rectifier, which is connected to an inverter via a DC voltage intermediate circuit, such that the AC voltage which is produced by the land supply system can be converted to the AC voltage which is suitable for the respective marine-vessel distribution system. This makes it possible to use a 50 Hz land supply system to supply electrical power to a marine-vessel distribution system which is designed for 60 Hz AC voltage.

According to one further development of the invention in this context, transformers are arranged on both sides of the frequency converter. In this case, during operation of the apparatus, the cable connection or the cable connections extends or extend, for example, between the marine-vessel distribution system and the transformer, which is arranged between the frequency converter and the marine-vessel system connection.

BRIEF DESCRIPTION OF THE SEVERAL VIEWS OF THE DRAWING

The invention will be described in the following text using exemplary embodiments and with reference to the figures of the drawing, in which the same reference symbols refer to components having the same effect, and in which.

DESCRIPTION OF THE INVENTION

Figure 1:
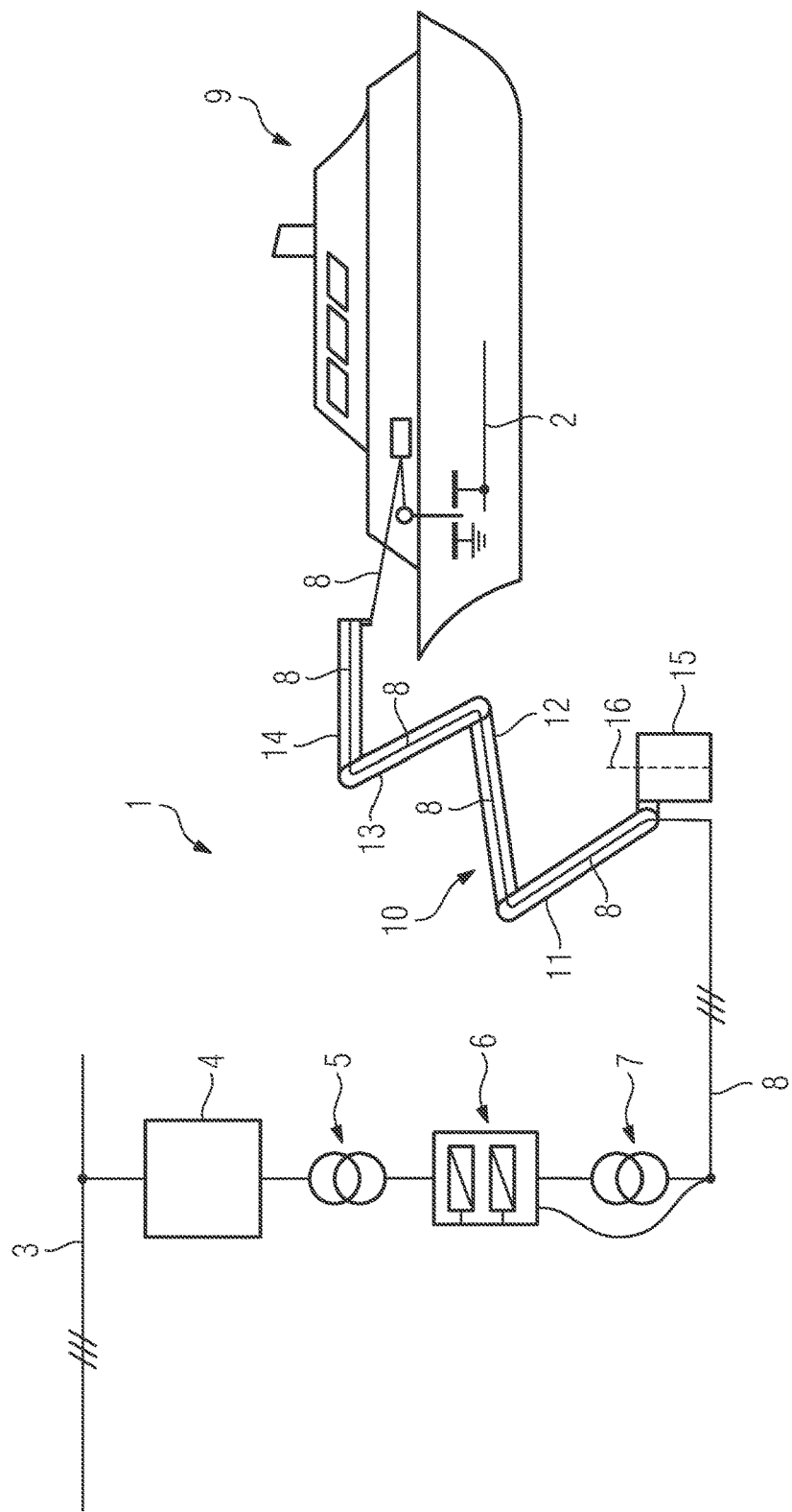
FIG. 1 shows a schematic illustration of one exemplary embodiment of the apparatus according to the invention.

FIG. 1 shows one exemplary embodiment of the apparatus 1 according to the invention, which is used to supply power to a marine-vessel distribution system 2 in a marine vessel 9 through a supply system 3 on the land. For electrical connection to the supply system 3, the apparatus 1 has a supply system connection 4, which is connected via a transformer 5 to a frequency converter 6, with the frequency converter 6 being followed by a further transformer 7. The transformer 7 is connected via a cable connection 8 to a marine-vessel system connection, which is not illustrated in the figure, and in this way connected to the marine-vessel distribution system 2. In this case, the supply system connection 4, the transformers 5, 7 and the frequency converter 6, which may also be referred to as a close coupling, are arranged on the land.

The supply system connection 4 in the exemplary embodiment illustrated in FIG. 1 is in the form of a switchgear assembly, for example a medium-voltage switchgear assembly, thus allowing the marine-vessel distribution system 2 to be deliberately disconnected from the supply system 3 in the event of a fault in the supply system 3. The transformers 5, 7 are used to provide the suitable voltage for the frequency converter 6 and for the marine-vessel distribution system 2.

In the exemplary embodiment illustrated in FIG. 1, the frequency converter 6 consists of two converters, which have a bridge circuit comprising power semiconductors which can be turned off, for example IGBTs, GTOs or the like. The converters in the frequency converter are connected to one another on the DC voltage side, with the inverter producing the AC voltage required for the respective marine-vessel distribution system 2, for example at 60 Hz. In contrast, the frequency of the land supply system is 50 Hz.

A jointed arm 10 is provided in order to carry the heavy cable connection 8 to the marine vessel 9 as quickly and easily as possible, and has four arm segments 11, 12, 13 and 14, which are connected to one another by means of articulated connections, which are not illustrated in FIG. 1. The pivot angle which is covered by the articulated connection between two arm segments 11, 12 which are articulated on one another can be varied by means of joint drives, which are likewise not illustrated in FIG. 1, such that the jointed arm 10 has a range and height which can be adjusted via the pivot angle, such that the cable connection can be supplied in a simple manner to marine vessels of different height and size. In this case, the jointed arm 10 is attached to a rotating tower 15 which is positioned on the land and can be rotated with respect to a vertical rotation axis 16. The free end of the jointed arm 10 can be aligned with the marine vessel 9 with the aid of the rotating tower 15.

Figure 2:
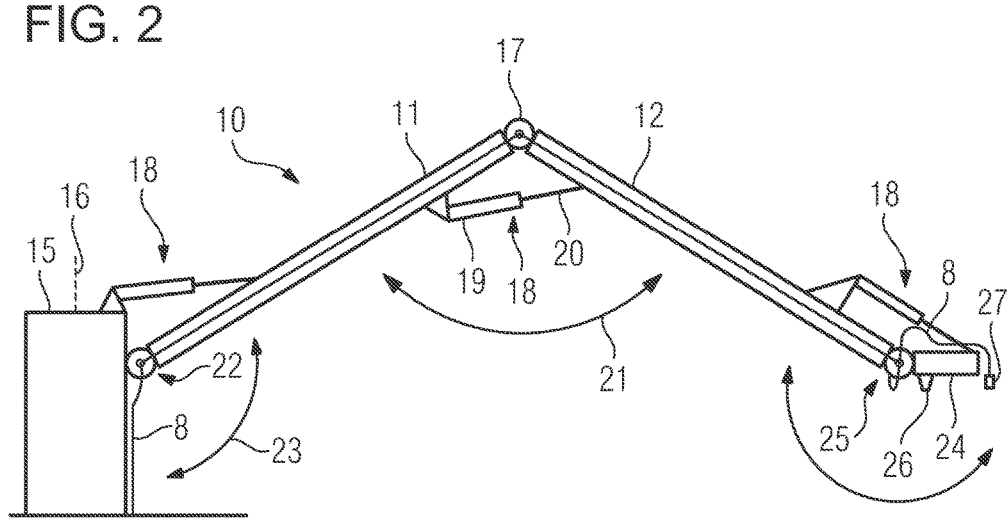
FIG. 2 shows a side view of one exemplary embodiment of a jointed arm for an apparatus according to the invention.

FIG. 2 shows one exemplary embodiment of a jointed arm 10 for an apparatus 1 according to the invention in more detail. The jointed arm 10 illustrated in FIG. 2 has only two arm segments 11, 12, which are connected to one another via an articulated connection 17. In order to support the arm segment 12 on the arm segment 11 such that it can rotate, the articulated connection 17 has a joint rotation axis, which runs into the plane of the drawing in FIG. 2. A joint drive 18 is used to pivot the arm segments 11, 12, which joint drive 18 is associated with the articulated connection, is in the form of a hydraulic drive and consists of a hydraulic cylinder 19, in which a hydraulic piston, which is not illustrated in the figure, bounds a hydraulic chamber which is filled with hydraulic fluid. A piston rod 20 is attached to the freely moveable hydraulic piston. The piston rod 20 is supported on the arm segment 12, with the hydraulic cylinder 19 being articulated on the arm segment 11. When the hydraulic pressure in the hydraulic cylinder 19 is increased, the piston rod 20 is moved out of the hydraulic cylinder 19, thus increasing the pivot angle 21.

As can likewise be seen in FIG. 2, the jointed arm 10 is connected via a further articulated connection 22 to the rotating tower 15, thus defining a further pivot angle 23. A cable end guide 24 and a cable end articulated connection 25, which is associated with a cable end drive 18, can be seen at the free end of the jointed arm 10 which is remote from the rotating tower 15. The cable end drive 18 allows the cable end guide 24 to pivot in the plane of the drawing. Furthermore, an insert part 26 can be seen, which can be inserted into a recess, which has a complementary shape, in the marine vessel, thus anchoring the jointed arm 10 to the marine vessel. Locking means for holding the jointed arm 10 on the marine vessel 9 are provided in this way. Furthermore, the cable end is equipped with a plug 27, which can be inserted into a corresponding plug socket, which is not illustrated in the figure, in the marine vessel 9, as a marine-vessel system connection.

Figure 3:
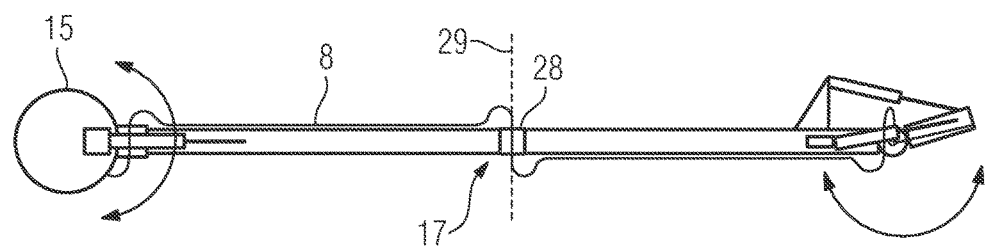
FIG. 3 shows the jointed arm as shown in FIG. 2, from above.

FIG. 3 shows a plan view of the jointed arm 10 shown in FIG. 2. This shows in particular that the rotating tower 15 can be rotated about a vertical rotation axis. The figure also shows that the articulated connection 17 forms a hollow cylinder 28, through which the cable connection 8 extends, at the same time defining a joint rotation axis 29, which runs at right angles to the vertical rotation axis 16 of the rotating tower 15. The articulated connections for connection of the arm segments or for supporting the jointed arm 10 on the rotating tower have only one rotation axis, thus allowing pivoting in only one direction. The cable end articulated connection 25 is, however, equipped with a second joint rotation axis. The cable end guide 24 can therefore be pivoted in two directions, thus making it easier to feed the plug 27 accurately into the associated socket in the marine-vessel system connection, and to connect the locking means.

The invention claimed is:

1. An apparatus for electrical connection of a polyphase marine-vessel distribution system in a marine vessel to a polyphase land supply system having a supply system connection disposed on land and to be connected at least in sections through at least one cable connection to a marine-vessel system connection of the marine-vessel distribution system, the apparatus comprising:

at least one jointed arm for supporting the at least one cable connection and for compensating movements of the marine vessel caused by water movements after connecting the distribution and supply systems and while supplying electrical power, said at least one jointed arm having:
a free end;
arm segments, at least one articulated connection interconnecting said arm segments and compensating the movements of the marine vessel, at least one joint drive configured to be switched on and off and being respectively associated with said at least one articulated connection for mutually pivoting said arm segments, wherein said articulated connection is configured for freely pivoting movement when said at least one joint drive is switched off; and a locking device configured to fix said free end of said at least one jointed arm to the marine vessel during movement of the marine vessel.

2. The apparatus according to claim 1, wherein each said at least one articulated connection allows pivoting about one respective joint rotation axis.

3. The apparatus according to claim 2, wherein said at least one articulated connection includes a plurality of articulated connections having respective joint rotation axes aligned parallel to one another.

4. The apparatus according to claim 3, wherein said joint rotation axes are each defined by a respective hollow cylinder through which each the at least one cable connection extends.

5. The apparatus according to claim 1, which further comprises a rotating tower configured to rotate about a vertical rotation axis and being attached to said at least one jointed arm.

6. The apparatus according to claim 5, which further comprises an articulated connection for articulating said at least one jointed arm on said rotating tower.

7. The apparatus according to claim 5, wherein said rotating tower is configured to be moved in one direction.

8. The apparatus according to claim 1, wherein each said at least one joint drive is a hydraulic drive.

9. The apparatus according to claim 1, wherein said locking device has an insert part disposed at said free end of said at least one jointed arm and a holding part having a shape complementary to said insert part and being disposed on the marine vessel.

10. The apparatus according to claim 1, which further comprises monitoring devices each detecting a pivot angle covered by a respective one of said arm segments relative to a respective said at least one articulated connection and triggering a warning signal if a pivot angle threshold value is exceeded.

11. The apparatus according to claim 1, which further comprises at least one cable end guide holding an end of the at least one cable connection configured for connection to the marine-vessel system connection, at least one cable end articulated connection disposed at a free end of said jointed arm and holding said at least one cable end guide, and at least one cable drive associated with said at least one cable end articulated connection for pivoting said at least one cable end guide.

12. The apparatus according to claim 11, wherein said at least one cable end articulated connection has two pivot axes extended at right angles to one another.

13. The apparatus according to claim 1, which further comprises a frequency converter disposed on land for connecting the supply system connection to the marine-vessel system connection.

14. The apparatus according to claim 13, which further comprises transformers each disposed on a respective side of said frequency converter.

* * * * *